(12) United States Patent
Halbo et al.

(10) Patent No.: US 7,758,333 B2
(45) Date of Patent: Jul. 20, 2010

(54) DEVICE FOR TREATING CONTAINERS

(75) Inventors: Hansjoerg Halbo, Maxhuette-Haidhof (DE); Wolfgang Roidl, Deuerling (DE); Florian Schmid, Ihrlerstein (DE); Erik Blochmann, Neutraubling (DE); Christian Stoiber, Michelsneukirchen (DE)

(73) Assignee: Krones AG (DE)

( * ) Notice: Subject to any disclaimer, the term of this patent is extended or adjusted under 35 U.S.C. 154(b) by 177 days.

(21) Appl. No.: 12/047,248

(22) Filed: Mar. 12, 2008

(65) Prior Publication Data

US 2008/0224362 A1 Sep. 18, 2008

(30) Foreign Application Priority Data

Mar. 14, 2007 (DE) .................. 10 2007 013 096

(51) Int. Cl.
*B29C 49/36* (2006.01)
*B29C 49/58* (2006.01)

(52) U.S. Cl. .................. 425/535; 425/540

(58) Field of Classification Search ............... 425/535, 425/540; 65/261; *B29C 49/58*
See application file for complete search history.

(56) References Cited

U.S. PATENT DOCUMENTS

| | | | | |
|---|---|---|---|---|
| 1,209,472 A * | 12/1916 | Meyer, Jr. ................ | 65/261 |
| 1,285,420 A * | 11/1918 | Scull ....................... | 65/300 |
| 3,880,640 A * | 4/1975 | Jenkins ................... | 65/261 |
| 4,146,882 A | 3/1979 | Hoff, Jr. et al. ........... | 340/347 |
| 4,552,527 A | 11/1985 | Hunter .................... | 425/535 |
| 4,726,833 A * | 2/1988 | Foster .................... | 65/300 |
| 5,454,707 A | 10/1995 | Mitchell et al. | |
| 6,464,486 B1 | 10/2002 | Barray et al. | |
| 6,769,895 B2 * | 8/2004 | Derouault et al. ........ | 425/145 |
| 6,848,273 B2 * | 2/2005 | Leidy et al. .............. | 65/261 |
| 6,905,326 B2 | 6/2005 | Voth et al. | |
| 7,165,956 B2 * | 1/2007 | Santais et al. ............ | 425/535 |
| 7,563,092 B2 * | 7/2009 | Mie ......................... | 425/535 |
| 2006/0115546 A1 | 6/2006 | Santais et al. ............ | 425/3 |
| 2007/0254061 A1 | 11/2007 | Dannebey ............... | 425/522 |
| 2008/0254161 A1 * | 10/2008 | Rousseau et al. ........ | 425/541 |

FOREIGN PATENT DOCUMENTS

| | | |
|---|---|---|
| DE | 1 675 385 | 1/1971 |
| DE | 33 01 975 | 8/1983 |
| DE | 200 18 500 | 10/2000 |
| DE | 69800516 | 8/2001 |
| DE | 101 41 517 | 6/2002 |
| DE | 603 04 899 | 11/2006 |
| EP | 0768944 | 4/1997 |
| FR | 2 737 763 | 2/1997 |
| FR | 2 871 721 | 12/2005 |

(Continued)

*Primary Examiner*—Robert B Davis
(74) *Attorney, Agent, or Firm*—Hayes Soloway P.C.

(57) ABSTRACT

A device (1) for treating containers (10) with a nozzle device (4) which fills the container (10) with a gaseous medium, wherein the nozzle device (4) can be introduced at least partly in a mouth (12) of the container (10). Furthermore a wall body (6) is provided which surrounds completely at least one area of the nozzle device in the peripheral direction, and a sealing device (8) to seal a space (R) between the container (10) and the wall body (6).

Figure 1:
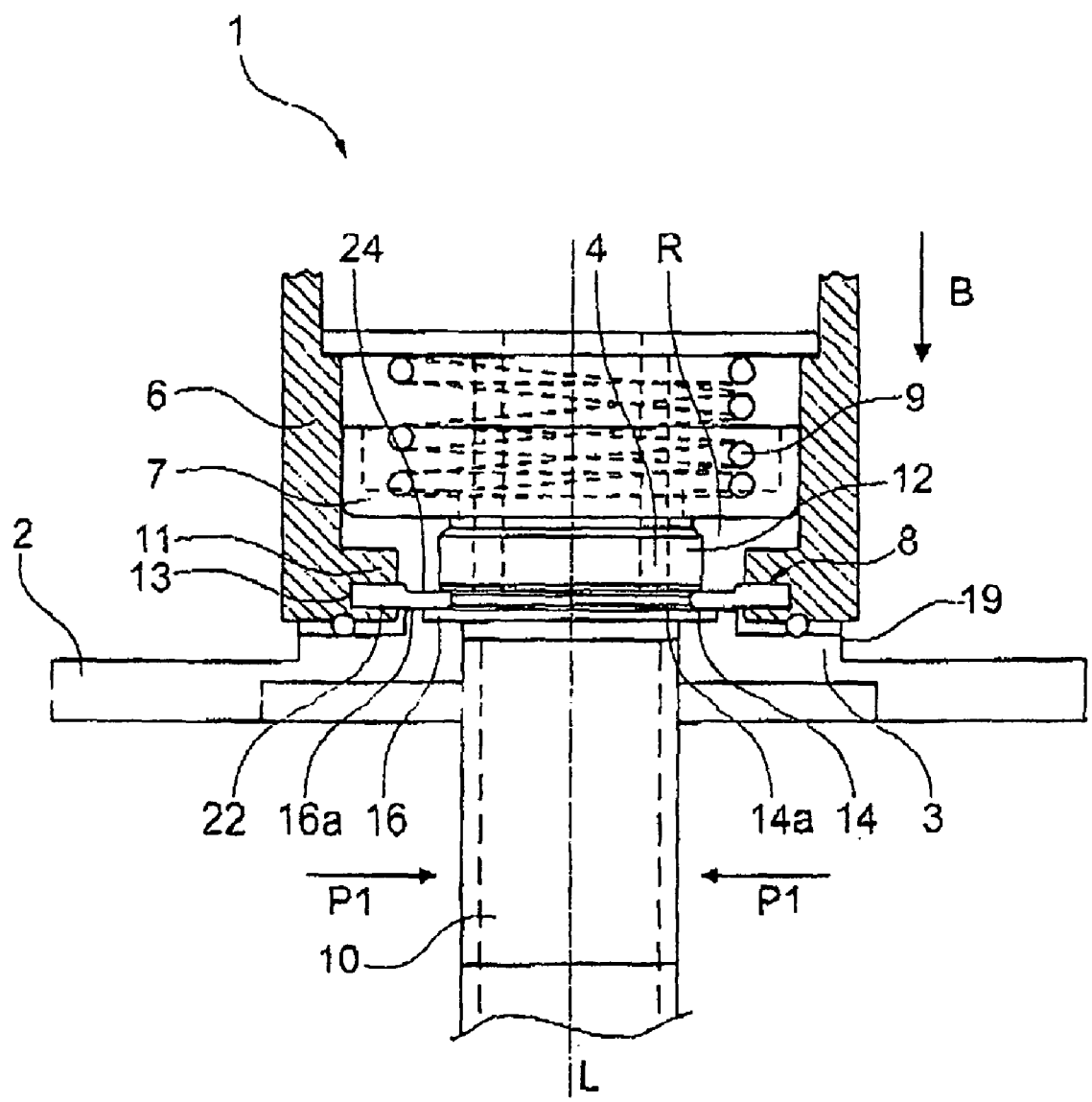

According to the invention the sealing device (8) can be pressed in a substantially radial direction against the outer periphery of the mouth (12) of the container (10).

15 Claims, 4 Drawing Sheets

FOREIGN PATENT DOCUMENTS

| | | | |
|---|---|---|---|
| FR | 2889673 A1 * | 2/2007 | |
| FR | 2912678 A1 * | 8/2008 | |
| FR | 2921582 A1 * | 4/2009 | |
| GB | 453123 | 9/1936 | |
| GB | 1400786 | 7/1975 | |
| GB | 2114502 | 8/1983 | |
| JP | 2004034567 A * | 2/2004 | |
| NL | 8901767 | 2/1991 | |
| WO | WO 96/01729 | 1/1996 | |

\* cited by examiner

DEVICE FOR TREATING CONTAINERS

The invention relates to a device for treating containers, and more precisely a blow-moulding nozzle for blow-moulding containers.

As part of the production of various vessels, it is known in the prior art to inflate these with a blow-moulding nozzle. Here corresponding blanks are heated and then exposed to compressed air at a pressure in the range of 40 bar through a blow-moulding nozzle. Because of the high pressure, generally an escape of air or other gaseous medium used to expand the container, from a pressure chamber is prevented. In the prior art, devices are known which have a sealing ring which can be laid on the neck of the container before the actual blow-moulding process and in this way a sealed compartment created. As part of cost and weight reduction measures however, more recently said collar of the blank has also been reduced in the radial direction so that in some cases the seal can no longer be applied to this, as was previously the case, in the longitudinal direction of the container.

EP 0 768 944 B1 discloses a sealing device between a preform of a plastic container and a blow-moulding nozzle, and a blow-moulding machine using such a sealing device. A blow-moulding nozzle has a seal which during application of compressed air to the nozzle presses against an inner wall of the container to be inflated. In this embodiment however a complete seal is only achieved when a certain pressure has built up inside the container.

DE 698 00516 T2 discloses a blow-moulding nozzle for a plastic container and a device which uses such a blow-moulding nozzle. Here a sealing body lies not on the container itself but on a carrier plate holding the blank. GB 2 114 502 A discloses a method for moulding hollow thermoplastic bodies. A preform is connected to a blow-moulding head in a sealed manner.

The present invention is based on the object of providing a device for treating containers, and in particular a blow-moulding nozzle for inflating containers, which during the blow-moulding process allows a secure seal even on performs with collar reduced in the radial direction. More particularly, in one aspect the present invention provides a device for treating a container, said device having a nozzle device for filling the container with a gaseous medium, a wall body which surrounds at least one area of the nozzle device completely in a peripheral direction, and a sealing device for sealing a space between the container and the wall body, wherein the sealing device can be moved in a substantially radial direction against an outer surface of the mouth of the container. The invention also provides a sealing device for the aforesaid device, wherein the sealing device is formed of one piece, is made of an elastomer and comprises a circular cross-section and an annular base body, and wherein the sealing device in a first operating state has a first pre-specified inner diameter and in a second operating state a second inner diameter deviating from the first pre-specified inner diameter, on the base body lies an annular sealing section which is swivellable in relation to the base body and extends inward in relation to the base body, the sealing section in a first operating state of the sealing device extending obliquely in relation to a plane of the sealing device. The invention also provides a method for treating containers, wherein the container is filled with a gaseous medium delivered by a nozzle device and a wall body is pushed about the outer periphery of a mouth of the container, and wherein a sealing device is applied in the radial direction to the outer surface of the mouth of the container to seal a space formed between the container and the wall body.

The device according to the invention for treating containers has a nozzle device which fills the container with a gaseous medium. In a preferred refinement of the invention, the nozzle device can be inserted at least partly into the mouth of the container. The term "mouth" means a zone of a preform which has a collar and the area extending over this in the direction of the casting opening. According to a preferred refinement of the invention, the mouth has a thread. The term "collar" refers to a radially protruding material accumulation over at least part of the periphery, which is preferably formed as a ring. The collar can for example can be formed as a carrier ring and as a locking ring.

In addition a wall body is provided which surrounds the nozzle device completely in the peripheral direction in at least one (longitudinal) zone, and with a sealing device to seal the space between the container and the wall body. According to the invention the sealing device can be moved essentially in the radial direction towards the outer surface of the container opening. The movement preferably means that a force-fit connection is produced, e.g. press contact between the sealing device and container. It is conceivable both that the sealing device lies on the outer periphery of the mouth and that it lies on the surface of the mouth, such as for example on the collar. It is also conceivable that the sealing device lies both on the blow-moulding and on the collar, or both on the mouth and on the collar.

A nozzle device in the context of the present invention is any device through which a gaseous medium can pass. The gaseous medium is in particular but not exclusively air with which the preform can be expanded.

A wall body in the sense of the present invention is in particular a cylindrical wall which in a longitudinal direction of the container surrounds the nozzle device, or a zone of the nozzle device, completely in its longitudinal direction. Preferably this wall body is pushed over the mouth of the preform before the inflation process and then the space between the container and the wall body sealed using a sealing device.

Because the sealing device can be pressed in a substantially radial direction against the outer periphery of the mouth, it is possible to reduce the radius of the former collar without at the same time having to accept a loss of sealing quality. The term "substantially radial direction" means that the sealing device can be pressed against the outer periphery of the container in a direction which, in relation to the longitudinal direction of the container, encloses an angle of between 60° and 120°, preferably between 70° and 110°, particularly preferably between 80° and 100° and particularly preferably between 85° and 95°.

Preferably the sealing device can be pressed in the radial direction against the outer periphery of the container mouth even before the actual filling process. This achieves that the actual process of filling the container can be performed even on a complete seal of the container. It would however also be possible to design the sealing device so that only on initiation of the actual filling process is it pressed against the outer periphery of the container by the built-up pressure.

In a further advantageous embodiment the sealing device has an annular shape with a modifiable internal cross-section or internal diameter. The change in internal cross-section allows a section of the sealing device to lie on the outer periphery of the container, preferably all around. The effect of the modifiable internal cross-section or inner diameter of the sealing device is to push this with a greater cross-section over the mouth of the container, and it is contracted, e.g. its cross-section reduced, only when it has reached the end position in the longitudinal container direction and in particular has already been pushed over one thread on the mouth of the bottle neck.

Preferably an area of the sealing device is arranged on the wall body. Particularly preferably this is a radially external area which also lies completely on the wall body in the peripheral direction and is attached thereto. Thus a pressing of the sealing device on the container seals the space between the container and the wall body.

In a further advantageous embodiment the sealing device is made from an elastomer.

Particularly preferably sealing device has a base body and a sealing section that is swivellable in relation to this base body. Particularly preferably the base body is arranged on the wall body.

By swivelling the sealing section in relation to the base body, it is achieved that an area of the sealing section moves radially inwards and lies in the radial direction on the mouth of the container.

Particularly preferably the wall body has a fixing section protruding radially inwards, on which the sealing device is attached. The sealing device thus encloses the space between this sealing section and the container.

In a further preferred embodiment the wall body has a recess arranged on the sealing device. This recess serves to ensure that on swivelling of the sealing section, a zone of the sealing device can enter this recess and in this way the swivelling process is facilitated.

In a further advantageous embodiment the wall body has one or more contact bodies that can be moved on the container. On a downward movement of the wall body, these contact bodies press for example on the sealing device and cause a radially inward movement of the sealing device and hence close the space between the wall body and the container. It is however also possible to design the wall body swivellable as a whole.

It is furthermore possible that the sealing device is arranged directly on one or more contact bodies and by a movement of the contact body radially inwards, the sealing device is pressed onto the container.

Preferably the contact body on its outer periphery has an outer surface tapering in the longitudinal direction of the container. Particularly preferably this outer surface tapers downwards i.e. towards the base of the container. On a downward movement of the wall body, this outer surface can cooperate with a counter surface, the downward movement of the wall body simultaneously pressing the contact body radially inwards.

In a further advantageous embodiment the device has a pressure channel, wherein the sealing ring can be pressed against the container by means of a gaseous pressure medium sent through this pressure channel. Particularly preferably this is the same pressure medium which is used to fill the container. In this embodiment as soon as a pressure builds up in the space between the container wall and the wall body, this pressure causes the sealing device to compress in the radial direction and come to lie on the container.

In a further preferred embodiment the sealing device is arranged in a pressure chamber and can be moved in relation to this pressure chamber. Preferably the pressure channel opens into this pressure chamber and by pressurisation of the channel with a pressure medium, the pressure chamber is also pressurised and thus the sealing device moved radially inwards. Preferably both the pressure channel and the pressure chamber are arranged in the wall body.

In a further advantageous embodiment the inner cross-section or inner diameter of the sealing device tapers in the longitudinal direction of the container. More precisely the sealing device has a sealing section and this sealing section tapers in the longitudinal direction of the container from top to bottom.

According to a further embodiment of the invention the sealing device is formed as a hose which can be inflated using compressed air. The hose is preferably located in a pressure chamber, whereby inflation of the sealing device causes a radial movement towards the mouth of the container.

The present invention is furthermore aimed at a sealing device for a device of the type described above. This sealing device is formed as one piece, consists of an elastomer and has a circular cross-section with a circular base body. According to the invention the sealing device in a first operating state has a first pre-specified internal diameter and in a second operating state a second internal diameter deviating from the first. Furthermore on the base body is an annular sealing section, wherein this sealing section is swivellable in relation to the base body and extends radially inwards in relation to the base body. The sealing section in the first operating state of the sealing device runs obliquely in relation to a plane of the sealing device. For example the sealing section in one operating state has a conical or tapered design in relation to the base body.

In a further preferred embodiment, between the base body and the sealing section is a transitional section, where particularly preferably in the transitional runs a geometric swivel line about which the sealing section can swivel in relation to the base body.

The present invention is furthermore aimed at a method for treating containers, wherein these are filled with a gaseous medium by means of a nozzle device. Preferably the nozzle device is introduced at least partly into a mouth of the container, whereby the preform is automatically centred in a blow-moulding. Furthermore a wall body is pushed around the outer periphery of the mouth.

According to the invention the sealing device lies in a radial direction on the outer surface of the container mouth in order to seal against the environment a space formed between the container and the wall body. In relation to the prior art, in the method according to the invention the sealing body lies from the outside radially against the mouth of the container, wherein the mouth can also mean the collar of the container.

Preferably the sealing device is placed on the outer periphery of the container before the container is filled with gaseous medium. The space between the outer periphery of the container and the wall body is thus closed before the container is filled with compressed air. This prevents, during the start of the filling process, air escaping to the outside and causing a disruptive noise and increasing the air consumption unnecessarily.

The invention is preferably used in the production of bottles of plastic, preferably PET. The bottles are preferably produced in a stretch blow-moulding machine, particularly preferably a rotation stretch blow-moulding machine. In the stretch blow-moulding machine are several blow-moulding devices which each comprise at least one blow-mould, a device for production of bottles and at least three valves for switching the blow-moulding air.

Figure 2:
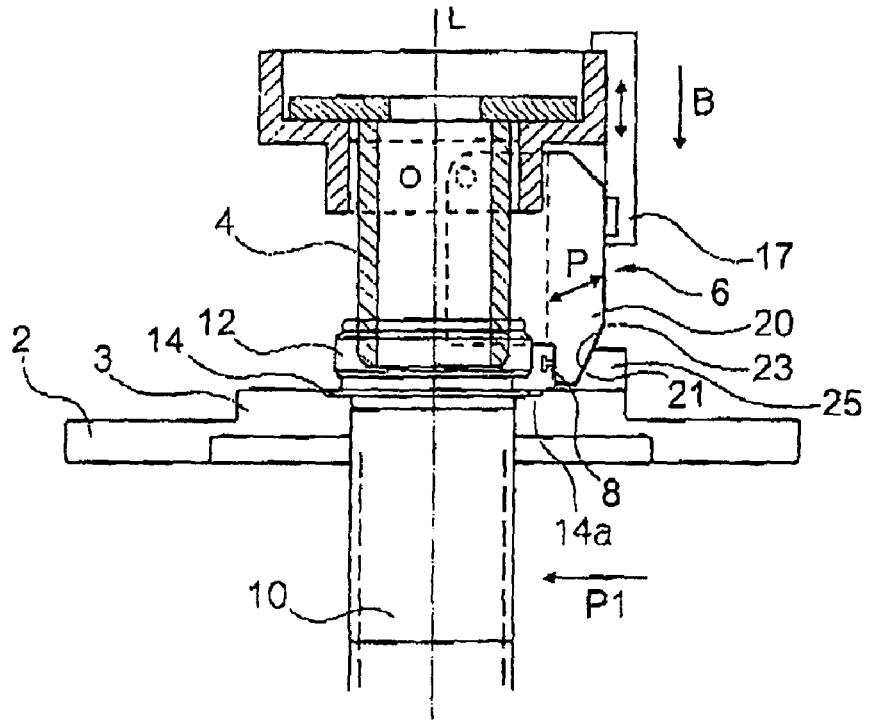
Figure 3:
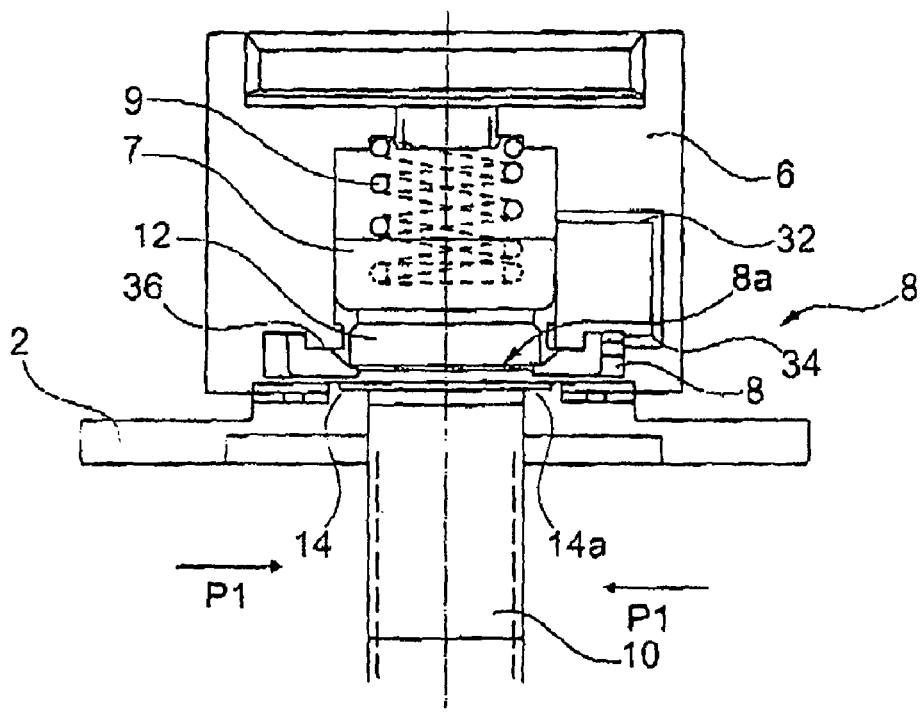
Figure 4A:
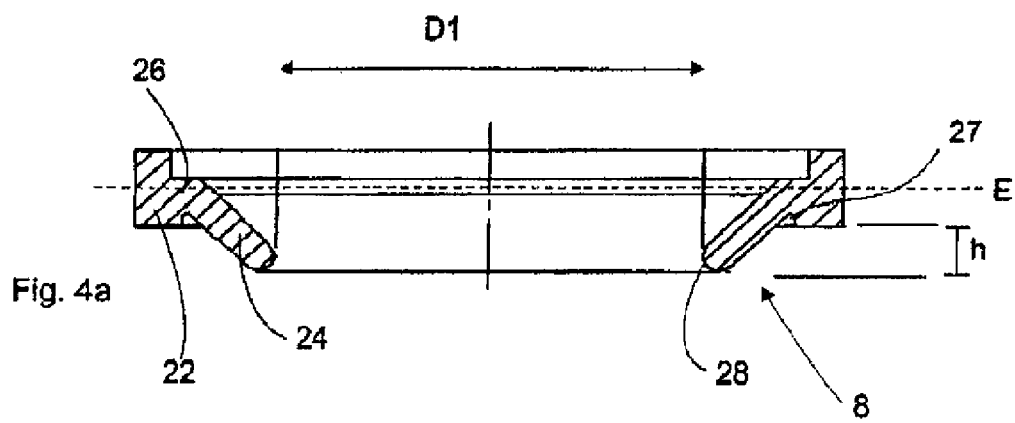
Figure 4B:
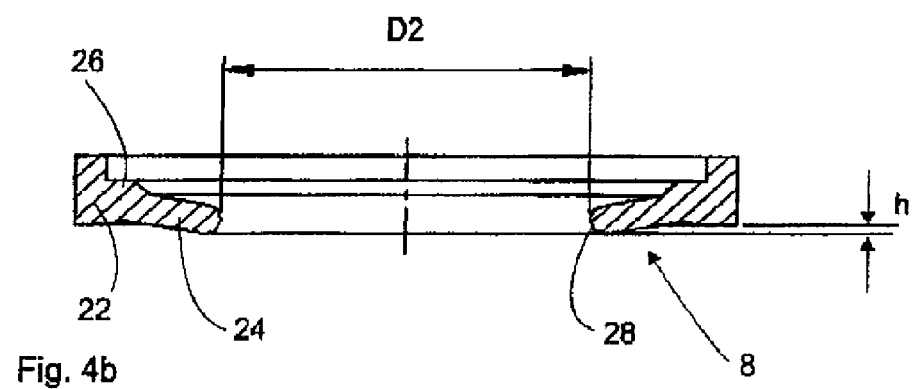
Figure 4C:
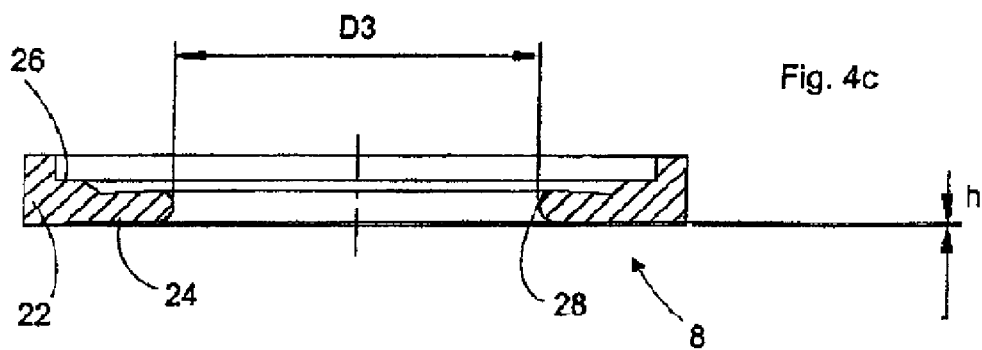
Figure 4D:
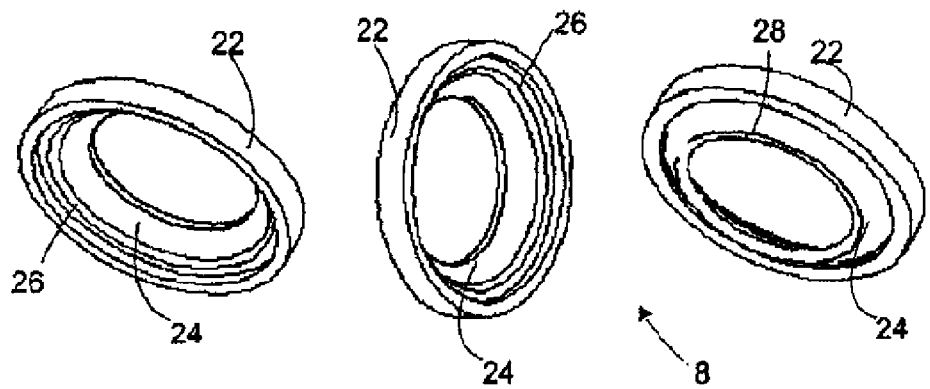
Figure 5:
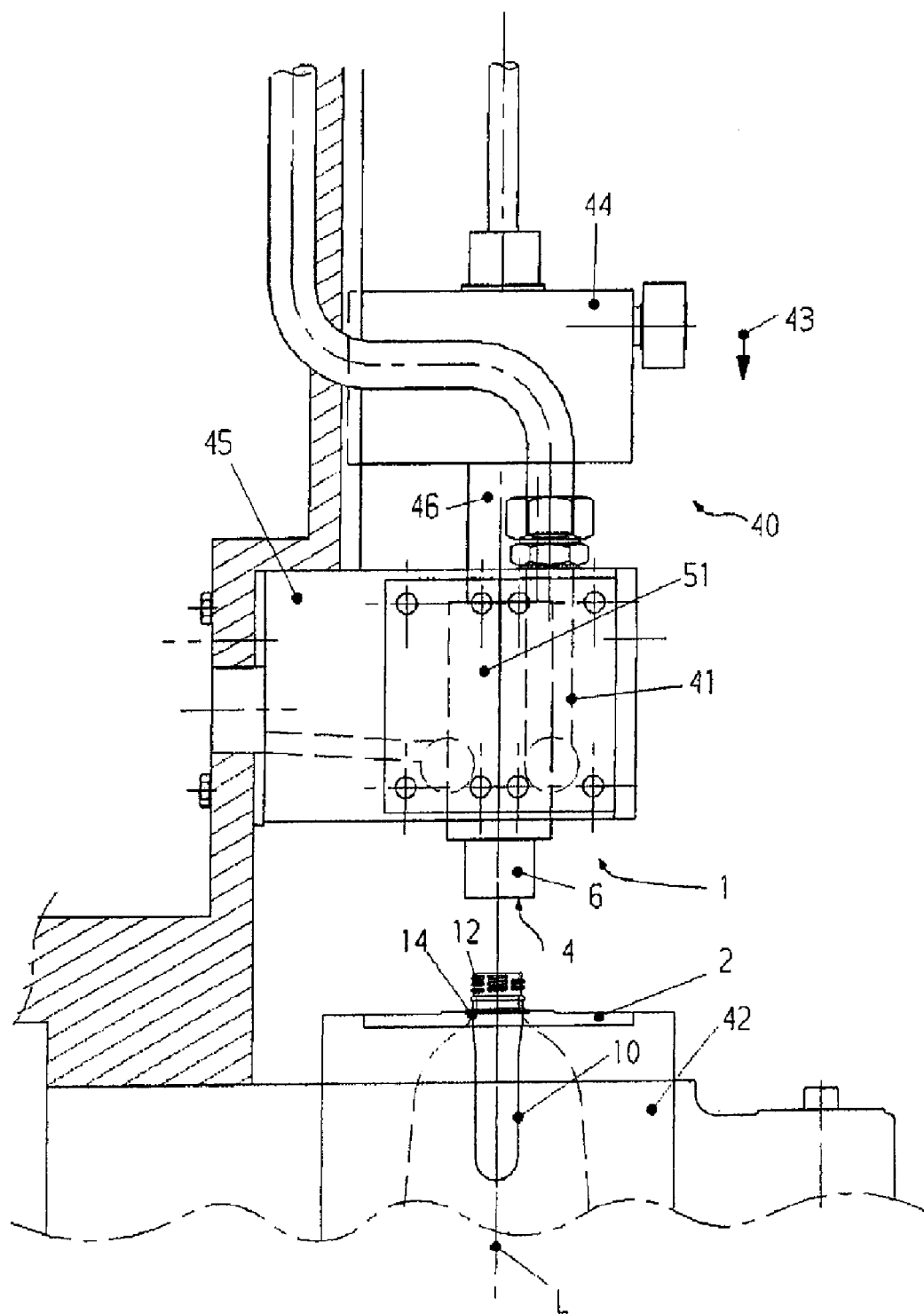

Further advantageous embodiments arise from the enclosed drawings. These show:

FIG. 1 a device according to the invention for treating containers in a first embodiment;

FIG. 2 a device according to the invention for treating containers in a second embodiment;

FIG. 3 a device according to the invention for treating containers in a third embodiment;

FIG. 4a a sealing device according to the invention in a first state;

FIG. 4b the sealing device from FIG. 4a in a second state;

FIG. 4c the sealing device from FIG. 4a in a third state;

FIG. 4d three prospective views of the sealing device according to the invention; and FIG. 5 a blow-moulding device for production of containers.

FIG. 1 shows a device 1 according to the invention for treating containers in a diagrammatic view. Reference numeral 10 refers to a container or a neck of a container which during the blow-moulding process rests in a centring plate 2 that is part of a blow-moulding. More precisely an edge or collar 14 of the container 10 rests in a dip 16 formed in a protrusion 3 of the centring plate 2. The reference numeral 16a refers to a peripheral protrusion extending upwards which delimits the dip 16. The reference numeral 19 designates an O-ring which lies between a wall body 6 of the device 1 and the protrusion 3 but however preferably fulfils not a sealing function but a contact function. Reference character L indicates a longitudinal direction or longitudinal axis of the container 10.

Below the centring plate 2 is a blow-moulding (not shown). Reference numeral 4 indicates a nozzle device (partly shown in dotted lines) which is inserted in the mouth 12 to inflate the container 10.

To this end the wall body 6 together with a nozzle device 4 is moved downward in movement direction B. A pressure piece 7 rests opposite the mouth 12 of container 10 and is pressed up against the force of a spring 9 to a specific stop.

This pressure piece 7 is mobile in relation to the nozzle device 4 and wall body 6 in longitudinal direction L of container 10, in contrast to which the movements of the wall body 6 and the nozzle device 4 are coupled together or the nozzle device 4 is arranged on the wall body 6. The pressure piece 7 allows, on retraction of the nozzle device 4, the container 10 to detach more easily from the nozzle device 4 as the pressure piece 7 under the load of spring 9 presses the mouth 12 of the container downward in longitudinal direction L. More precisely this prevents, during retraction of the nozzle device 4, the container 10 moving with it in longitudinal direction L which would have the undesirable consequence that the sealing section of the sealing device 8 lying on the mouth 12 in FIG. 1 also moves upward and hence up possibly assumes an undesirable position.

Then the container 10 is pressurised with a pressure or compressed air via the nozzle device 4. The space R formed between the mouth 12 of container 10 and the wall body 6 is gas-tight during pressurisation, and in an ideal case no compressed air can escape outward in relation to the wall body 6. To this end a sealing device 8 is provided. This sealing device 8 is firmly arranged in a recess 13 of the wall body 6 and moves downward with the wall body 6 in movement direction B.

More precisely on the wall body 6 is provided a fixing section 11 which protrudes radially inwards, and in this fixing section 11 in turn is the recess 13 for the sealing device 8. On a downward movement of the wall body 6, a sealing section 24 of the sealing device 8 is pressed against protrusion 16a. This achieves that this sealing section 24 contracts in the radial direction indicated by arrow P1, since the sealing section 24 in FIG. 1 swivels up and comes to lie above the collar 14 of container 10 in a recess 14a in the area of the mouth. It should be noted that the collar 14 in this embodiment of the invention can be selected smaller in the radial direction than in the prior art, since the radial movement of the sealing device 8 or sealing section 24 is triggered not by the collar 14 but also by protrusion 16a.

By application of the sealing device 8 to the container 10 or recess 14a, the space between container 10 and wall body 6 is sealed in the area of the mouth 12.

FIG. 2 shows a further embodiment of a device according to the invention. Here again a nozzle device 4 is provided which penetrates into the mouth 12 of container 10. Furthermore here a multiplicity of contact bodies 20 is provided (only one contact body is shown) which surround an area of the mouth 12 preferably equidistant in the peripheral direction. On this contact body 20 again is arranged the sealing device 8. If the contact body 20 moves down in movement direction B, which corresponds to longitudinal direction L of container 10, an oblique surface 23 of the contact body 20 is pressed against a correspondingly shaped counter piece 25, and the contact body 20 and the other contact bodies not shown thus move radially inward with the sealing device 8. In this case too the sealing device 8 engages in recess 14a above the collar 14. The counter piece 25 is here arranged on the protrusion 3 of the centring plate. Here the counter piece 25 can be formed annular on the protrusion 3 or several counter pieces 25 can be provided in those areas of the protrusion 3 in which the contact bodies 20 are provided.

The individual contact bodies 20 are joined together by an air-tight material (not shown). For example it would be possible for an expandable hose or expandable sleeve to surround all contact bodies 20 in the peripheral direction of the nozzle device 4. It would also be possible for a corresponding hose to lie on the radially inner surfaces of the individual contact bodies 20. In addition the individual contact bodies 20 could be joined together individually by gas-tight material sections. The individual contact bodies 20 as a whole together with the air-tight material (not shown) constitute the wall body 6.

The individual contact bodies 20 are here arranged over the swivel point on a tubular body 17 so they can be moved slightly inwards in the radial direction (arrow P).

Reference numeral 21 designates an oblique surface on the counter piece 25 which, on downward movement of the wall body 6, causes the sealing device 8 to move in a radial direction towards the container 10 and thus achieve a sealing effect. In the embodiment shown in FIG. 2 it is possible that the sealing device 8 lies not only on the recess 14a but also on the mouth 12 of container 10. Here too, between the mouth 12 of container 10 and the wall body 6, a sealed space R is formed. In the embodiment shown in FIG. 2, first the downward movement of the wall body 6 seals the space R air-tight and only then is the container 10 filled with compressed air.

FIG. 3 shows a further embodiment of a device 1 according to the invention. In this embodiment the wall body 6 has a compressed air channel 32 and a pressure chamber 34 connected to this compressed air channel 32. The compressed air channel 32 is here formed peripheral and the pressure chamber 34 is filled with compressed air via the channel 32. The reference numeral 8 here again designates the sealing device which following pressurisation moves radially inwards and in this way again engages in the recess 14a and causes the sealing effect. Here too it is possible that the sealing device 8, which has an oblique surface 8a, lies at least partly on the mouth 12 of container 10. In the embodiment shown in FIG. 3 thus the seal is achieved first as a result of pressurisation, since only by this pressurisation is the sealing device 8 pressed radially inwards and in this way a seal achieved. Here the wall body 6 has a protrusion 36 or slip device which can slide radially inwards in relation to the sealing device 8. It must be noted that the sealing device 8 is moved as a whole on pressurisation and not a section of the sealing device 8 which is moved against another section thereof in the radial direction.

FIG. 4*a* shows a sealing device 8 for the device 1 shown in FIG. 1. This sealing device 8 has an annular base body 22 on which is arranged a sealing section 24. In FIG. 4*a* the sealing device 8 is shown in a first state, more precisely in unloaded state or in a state without pretension. This state exists before the sealing device 8 is lowered onto or around the container 10 or centring plate 2. The sealing section 24 here runs obliquely downwards or the sealing section 24 as a whole forms a frustoconical cross-section. Reference D1 relates to the inner diameter of the unloaded sealing device 8. Reference h designates the height by which the curved tip 28 protrudes down in relation to the base body 22. Between the base body 22 and sealing section 24 is a recess 27 which facilitates swivelling of the sealing section 24 in relation to the base body 22. The area 28 lies on the outer periphery or outer surface of the container 10. The sealing device 8 shown is FIGS. 4*a* to 4*c* is used in the device 1 shown in FIG. 1. Reference E refers to the plane of the sealing device 8.

FIG. 4*b* shows the sealing device 8 from FIG. 4*a* in a second state, here a state in which a certain pretension is applied to the sealing section 24. Under this pretension diameter D1 is reduced to diameter D2. The changes in diameter here lie in a range between 1 mm and 4 mm, preferably between 1.5 mm and 3.5 mm, and particularly preferably in a range between 1.5 mm and 2.5 mm. It is found that here the sealing section 24 is almost aligned with the base body 22, i.e. is shortly before its vertex.

FIG. 4*c* shows the sealing device 8 in FIG. 4*a* at the vertex, i.e. here the sealing section 24 is arranged substantially horizontally and hence in this position the smallest diameter of the sealing device 8 is determined. Height h between the sealing section 24 and base body 22 is here less than 1 mm, preferably less than 0.5 mm and particularly preferably less than 0.3 mm. Height h in FIG. 1 is around 3 mm. This means that as part of the downward movement, the tip 28 of sealing section 24 can be moved in relation to the base body 22 between 2 mm and 4 mm, preferably between 2.5 mm and 3.5 mm, and particularly preferably between 2.7 mm and 3.1 mm. These dimensions are particularly advantageous for the function of the sealing device 8 according to the invention and were established in long and complex experiments. Too great a height difference Δh between the states in FIG. 4*a* and 4*c* means that the area between the sealing section 24 and container 10 cannot be sealed completely. Too small a height difference would also lead to lack of seal.

FIG. 4*d* shows three perspective views of the sealing device 8 according to the invention. Here the base body 22 and the sealing section 24 arranged on the base body 22 are found. In addition the transitional section 26 is seen, about which the sealing section 24 can swivel in relation to the base body 22.

The sealing device 8 is here made of an elastomer and in particular a polyurethane system.

FIG. 5 shows a blow-moulding device 40 in a rotation stretch blow-moulding machine not shown here. The blow-moulding device 40 contains a blow-moulding 42 with a centring plate 2. A container 10 that has a collar 14 is placed in the blow-moulding 42 so that the collar 14 rests on the centring plate 2. The blow-moulding device 40 furthermore has a valve block 45 on which are mounted four valves (here only two are shown), 41 and 51. The valves switch the blowing air introduced into the container 10. The blow piston 14 moves through the valve block 45 and is height-adjustable by means of the adjustment device 44 along arrow 43. At the lower end of the blow piston 46 is the nozzle device 4 and wall body 6. Movement of the blow piston 46 in the direction of the arrow 43 moves the wall body 6 over the mouth 12 of container 10 and the sealing device 8, not shown here, creates a seal to the environment. Thus the container 10 can be inflated. According to a preferred refinement of the invention, in the blow piston 46 is a stretch rod not shown here which is introduced into the container 10 to stretch this during the blow-moulding process.

All features disclosed in the application documents are claimed as essential to the invention where they are novel individually or in combination in relation to the prior art.

The invention claimed is:

1. A device for treating a container, said device having a nozzle device for filling the container with a gaseous medium, a wall body which surrounds at least one area of the nozzle device completely in a peripheral direction, and a sealing device for sealing a space between the container and the wall body, wherein the sealing device can be moved in a substantially radial direction against an outer surface of the mouth of the container.

2. The device according to claim 1, wherein the nozzle device can be introduced at least partly in a mouth of the container.

3. The device according to claim 1, wherein the sealing device has an annular shape with a changeable internal diameter.

4. The device according to claim 1, wherein a zone of the sealing device is arranged on the wall body.

5. The device according to claim 1, wherein that sealing device is made of an elastomer.

6. The device according to claim 1, wherein the sealing device has a base body and a sealing section swivellable in relation to the base body.

7. The device according to claim 1, wherein the wall body has a radially inwardly protruding fixing section on which the sealing device is attached.

8. The device according to claim 1, wherein the wall body has a recess arranged on the sealing device.

9. The device according to claim 1, wherein the wall body has at least one contact body which can be moved to the container.

10. The device according to claim 8, wherein the contact body on its outer periphery has an outer surface tapering in a longitudinal direction of the container.

11. The device according to claim 1, wherein the device has a pressure channel through which gaseous pressure medium may be sent, whereby to press the sealing device against the container.

12. The device according to claim 1, wherein the sealing device is arranged in a pressure chamber and is moveable in relation to the pressure chamber.

13. The device according to claim 1, wherein the inner diameter of the sealing device tapers in the longitudinal direction of the container.

14. The device according to claim 1, wherein the device is part of a blow-moulding device for containers which comprises at least three valves to control the gaseous blowing medium.

15. The device according to claim 1, wherein the blow-moulding device is part of a blow-moulding machine which rotates about a central machine axis and comprises several blow-moulding devices arranged equidistant on a machine carousel.

* * * * *